E. MAZZA.
PROCESS AND DEVICE FOR SEPARATION OF THE ELEMENTS COMPOSING A GASEOUS MIXTURE BY MEANS OF CENTRIFUGAL ACTION.
APPLICATION FILED MAY 29, 1911.
1,137,774.
Patented May 4, 1915.
2 SHEETS—SHEET 2.
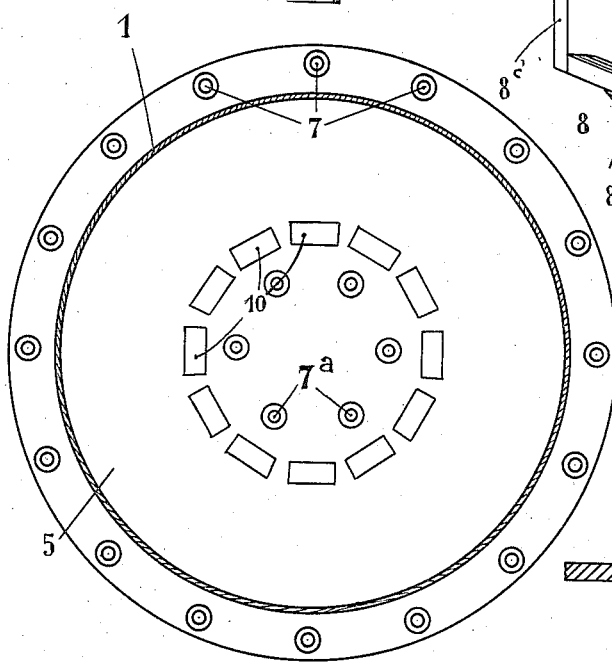
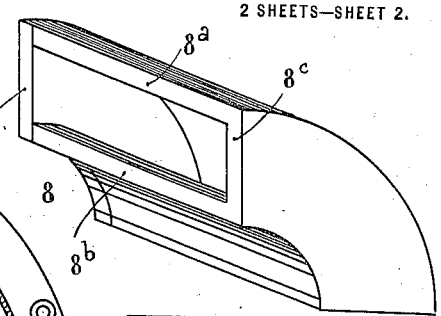
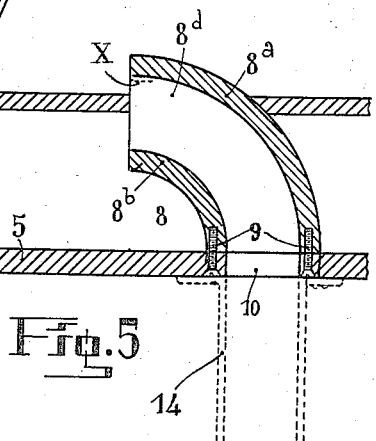
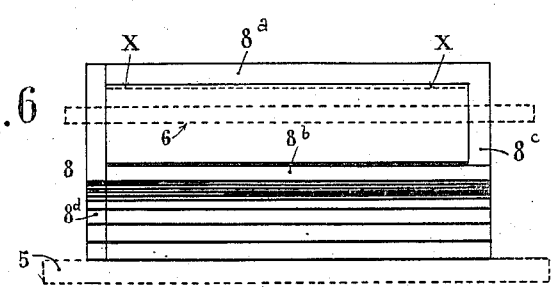
Witnesses
B. Dommers
Elizabeth Leckert.
Inventor.
Edoardo Mazza
By Henry Orth
Atty.

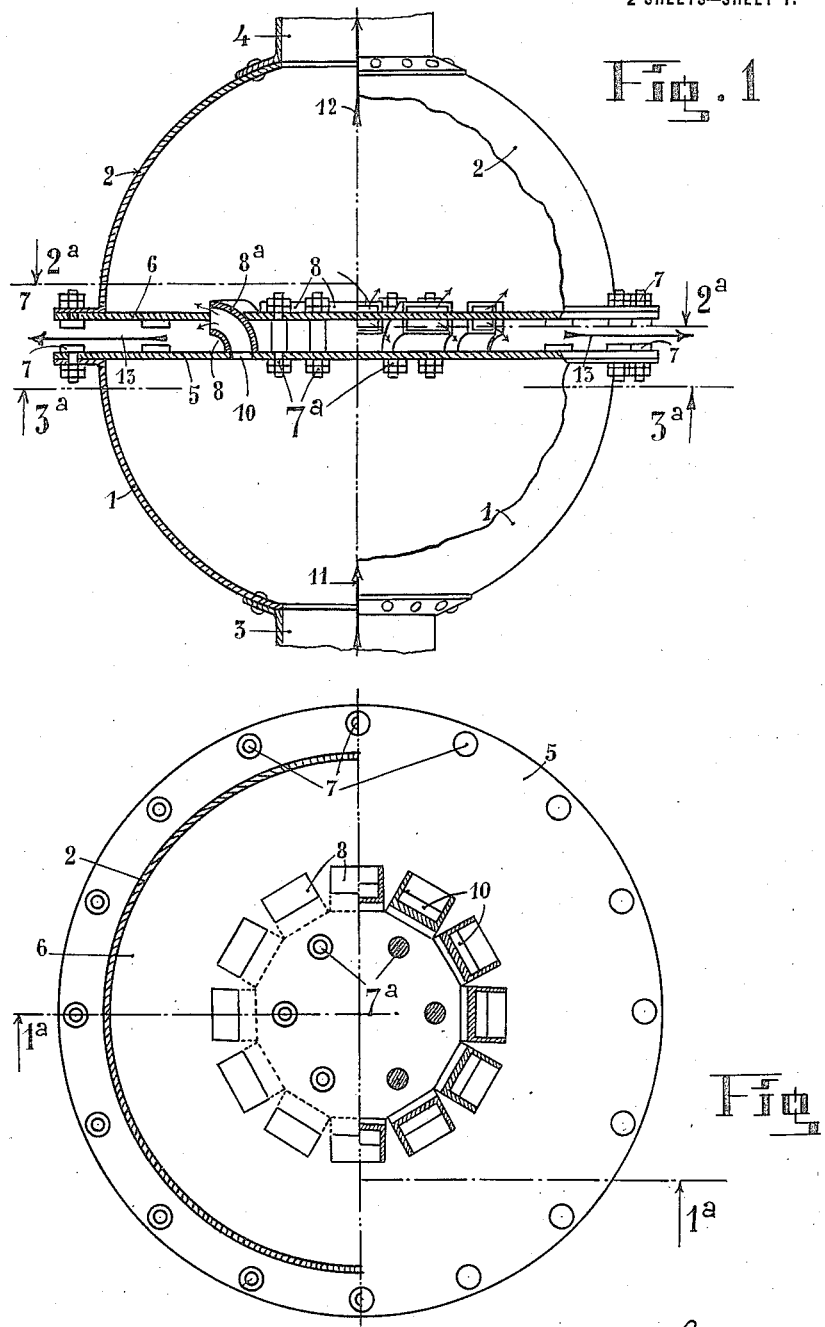

UNITED STATES PATENT OFFICE.

EDOARDO MAZZA, OF TURIN, ITALY.

PROCESS AND DEVICE FOR SEPARATION OF THE ELEMENTS COMPOSING A GASEOUS MIXTURE BY MEANS OF CENTRIFUGAL ACTION.

1,137,774.   Specification of Letters Patent.   Patented May 4, 1915.

Application filed May 29, 1911. Serial No. 630,153.

*To all whom it may concern:*

Be it known that I, EDOARDO MAZZA, engineer, a subject of the King of Italy, residing at Turin, Italy, have invented certain new and useful Improvements in Processes and Devices for the Separation of the Elements Composing a Gaseous Mixture by Means of Centrifugal Action; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to the method and means for the separation or partial separation of the constituent elements of mixtures of gases, vapors, or both. The separation is effected by centrifugal action induced by causing the mixture to be separated to assume a rapid arcuate or circular movement, thus causing the components of the mixture to separate into layers more or less distinct, depending upon the density of the components. In this manner the layers are formed and are then separated from one another and collected, if desired. Centrifugal action has heretofore been used by me for separating such mixtures as above described, but the means for inducing such action consisted of a rapidly rotating drum in which were formed spiral passages through which the mixture to be separated was caused to move under the action of a suction or pressure effect caused by the mechanical work of rotation of the drum. In some cases where the difference in density of the components of the mixture is very small, it would be necessary to give such a centrifugal drum such high peripheral speed as to be incompatible with the resistance of the materials of which such drum is made, and from a practical point of view becomes impossible.

The object of the present invention is to enable the separation by centrifugal action of the constituents of gas or vapor mixtures, or both, of any kind, whether they differ but slightly in density or not.

In the present invention the rotating or centrifugal action on the gaseous mixture is not obtained by a movable mechanical device but by driving the gas mixture through circular or arcuate channels of stationary separating elements. If the speed with which the gas mixture passes through or along such circular channels is sufficiently high, the centrifugal force acting upon it, produced by the circular path of the mixture, will provoke the separation into layers according to the density of the constituents. Now as the speed of the gas mixture through or along the circular channels depends upon the area of the section of the latter and upon the pressure to which the mixture is subjected, there is nothing to prevent the attainment of the required degree of centrifugal action to effect separation. The work required for the preliminary compression of the gas mixture represents the consumption of mechanical energy required for the separation. This energy is transferred into potential energy in the compressed mixture and is converted into kinetic energy during the passage of the mixture along the circular channels.

From the above it will be readily understood that apparatus for effecting the separation in accordance with what has been above stated may be given many forms.

The accompanying drawings show one of many forms of apparatus embodying my invention, and in which like parts are similarly designated.

Figure 1 is a vertical section on the line 1ª—1ª of Fig. 2. Fig. 2 is a horizontal section on the line 2ª—2ª of Fig. 1. Fig. 3 is a section on the line 3ª—3ª of Fig. 1. Fig. 4 is a perspective view of one of the arcuate or circular channels. Fig. 5 is a transverse section thereof, and Fig. 6 is an end view of the same.

The apparatus here illustrated comprises two substantially hemispherical tanks or calotts, 1 and 2, provided with sockets or unions 3 and 4 that are preferably but not necessarily the axes of the hemispherical chambers 1 and 2, respectively. The tanks 1 and 2 are provided with flat circular bottoms 5 and 6, secured thereto by bolts 7, and these bottoms are held distanced from one another by bolts 7ª.

The channels or separating elements 8, shown more clearly in Figs. 4–6, are secured to the plate 5 of tank 1 and their discharge ends extend partly into the tank 2, and through plate 6, and partly into the space between the two plates 5 and 6. These separating elements are arranged in a circle, as shown in Figs. 2 and 3. Each element 8 is rectangular in section, and consists of two concentric cylindrical walls $8^a$ and $8^b$ connected to flat arcuate or circular side walls $8^c$ and $8^d$. The ends of these elements preferably are at an angle of 90° to each other, so that the inlet and discharge are perpendicular to one another. The separating elements may have any other suitable shape in cross section. The separating elements are secured to plate 5 by means of screws 9 over holes 10 in said plate and corresponding in shape to the cross section of the elements. The discharge ends of the separating elements 8 pass partially through and fit tight in openings in the opposite plate 6 which cuts the outlet ports horizontally, and generally the lesser height of the outlet port discharges into tank 2, and the greater height between the two plates 5 and 6.

The mixture to be separated is forced in chamber 1 through the inlet 3, see arrow 11, and thence through the separating elements 8 with a speed dependent upon its compression and the total cross sectional area of all the elements 8. The potential energy of the mixture in 1 is converted into kinetic energy as the mixture passes through the separating elements and is forced by reason of the shape of these elements to take a circular path. By being forced to travel in a circular path the mixture is submitted to centrifugal action, and the heaviest constituents of the mixture follow the outside wall $8^a$ farthest from the center of rotation, while the lightest constituents follow the inner wall $8^b$.

By reason of the plate 6 dividing the outlet of the separating elements into two portions the heavier constituents enter the delivery chamber 2 and pass through the union 4, as indicated by the arrow 12, Fig. 1. The remaining portion of the gas passes through the lower portions of the ports between the plates 5 and 6 and will contain the lighter constituents of the mixture, or will at least be lighter than that portion of the mixture discharged into 2.

If atmospheric air be the gas mixture treated, dry air containing an excess of oxygen over the normal content of oxygen in the air treated will be discharged into 2, while that portion discharged between the two plates 5 and 6 may be richer in nitrogen and will contain some of the water vapor that constituted the humidity of the original air.

The air richer in oxygen discharged at 4 may be utilized for supplying blast air to metallurgical furnaces, or otherwise, while that passing between the plates 5 and 6 may be allowed to escape into the atmosphere.

Any kind of gas mixture may be treated in the manner described, and by passing that portion of the mixture, that it is desired to obtain, two or more times through the machine, a more complete separation will be obtained.

In order to obtain a high degree of centrifugal action in the separator 8 the radius of curvature of these separators should be as small as possible. Their linear length should also be reduced to a minimum to maintain the frictional resistance as small as possible, as said resistances decrease the centrifugal action. However, by reducing the linear length of the elements 8, the path of the gas mixture through them will, in general, be insufficient to permit the complete transformation of the potential energy of the mixture into kinetic energy, and to overcome this I prolong the separating elements by means of a rectangular extension 14, indicated in dotted lines, Fig. 5, downward into chamber 1 and its walls are continuations of the walls of the separating element 8, two of its walls being tangent to the walls $8^a$ and $8^b$. This extension is of sufficient length to permit almost the complete transformation of the potential energy of the mixture into kinetic energy.

There is a high back pressure at the upper layers or points at the discharge ends of the separators 8, due to centrifugal action and indicated at X, Figs. 5 and 6. This back pressure causes a reduction of speed of the out-flowing gas at these points, and consequently a decrease of the separation output. To overcome this to a great extent the outlet chamber 2 is placed under suction.

I claim—

1. The method of separating the constituents of gas mixtures, which comprises passing the mixture through stationary curved channels at sufficient speed to impart centrifugal action thereto and arrange the constituents therein more or less into layers, and deflecting different portions of the gas as it discharges from the channels.

2. The method of separating the constituents of a gas mixture, which comprises supplying the compressed mixture of fixed gases to a curved channel at sufficient speed to cause centrifugal action, and deflecting separate portions of the mixture at different radial distances at the end of said channel.

3. The method of separating the constituents of a gaseous mixture, which comprises supplying the compressed mixture to a channel, expanding the mixture in the channel, causing the mixture to make a turn of small radius at the end of the channel with sufficient speed to cause centrifugal action in the gases, and deflecting different portions of the mixture at the exit of the channel in accordance with their density.

4. The method of separating the constituents of a gaseous mixture, which comprises passing the mixture at high velocity through a stationary curved channel, separating the mixture at the mouth of the channel and placing the denser portion of the mixture at the mouth of the channel under suction.

5. The method of separating the constituents of gas mixtures, which comprises passing the mixture through a stationary channel curving through substantially ninety degrees at a speed sufficient to centrifugally arrange the constituents in layers according to their density, and separating, and discharging the separated layers at the exit of the channel.

In testimony that I claim the foregoing as my invention, I have signed my name in presence of two subscribing witnesses.

EDOARDO MAZZA.

Witnesses:
 FRANCENO GUNAM,
 JOCELYN GOUBEYRAN.